(No Model.) 3 Sheets—Sheet 1.

J. BUCKLEY.
SPRAYING MACHINE.

No. 590,537. Patented Sept. 21, 1897.

Attest:
M. L. Winston.
F. B. Hutchinson.

Inventor
J. Buckley,
By E. E. Whitmore,
Atty.

(No Model.) 3 Sheets—Sheet 3.

J. BUCKLEY.
SPRAYING MACHINE.

No. 590,537. Patented Sept. 21, 1897.

Attest:
M. L. Winston.
F. B. Hutchinson.

Inventor:
J. Buckley,
By E. B. Whitmore,
Atty.

UNITED STATES PATENT OFFICE.

JOHN BUCKLEY, OF ROCHESTER, NEW YORK, ASSIGNOR TO THE ROCHESTER MACHINE TOOL WORKS, OF SAME PLACE.

SPRAYING-MACHINE.

SPECIFICATION forming part of Letters Patent No. 590,537, dated September 21, 1897.

Application filed September 18, 1896. Serial No. 606,232. (No model.)

*To all whom it may concern:*

Be it known that I, JOHN BUCKLEY, of Rochester, in the county of Monroe and State of New York, have invented a new and useful Improvement in Spraying-Machines, which improvement is fully set forth in the following specification and shown in the accompanying drawings.

My invention relates to spraying-machines designed more particularly for spraying tall and large trees, such as the trees of apple and other orchards, ornamental trees of parks and gardens, shade-trees, &c.

The invention is a power-sprayer adapted to be mounted upon wheels—as, for example, upon the bolsters of a common farm-wagon—and drawn by horses around and among the trees to be sprayed. This spraying-machine involves a steam or other engine and a power force-pump.

The object of the invention is to provide a sprayer of large capacity by means of which two rows, for example, of trees may be sprayed simultaneously and while the machine is being drawn along by the horses attached, the machine being thus adapted to spray a great number of trees in a given time.

The invention is hereinafter more fully described and particularly pointed out.

Figure 1:
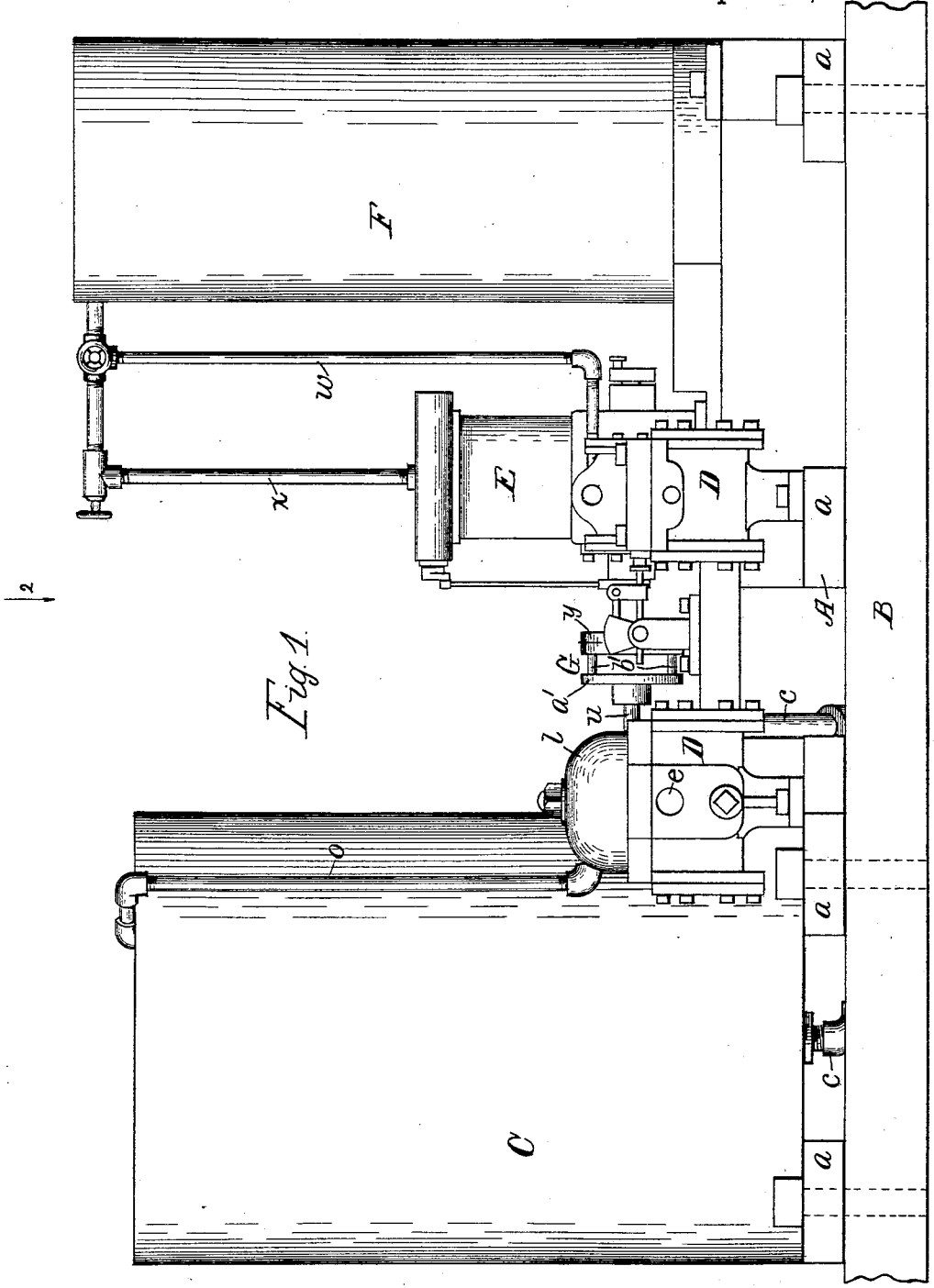
Figure 2:
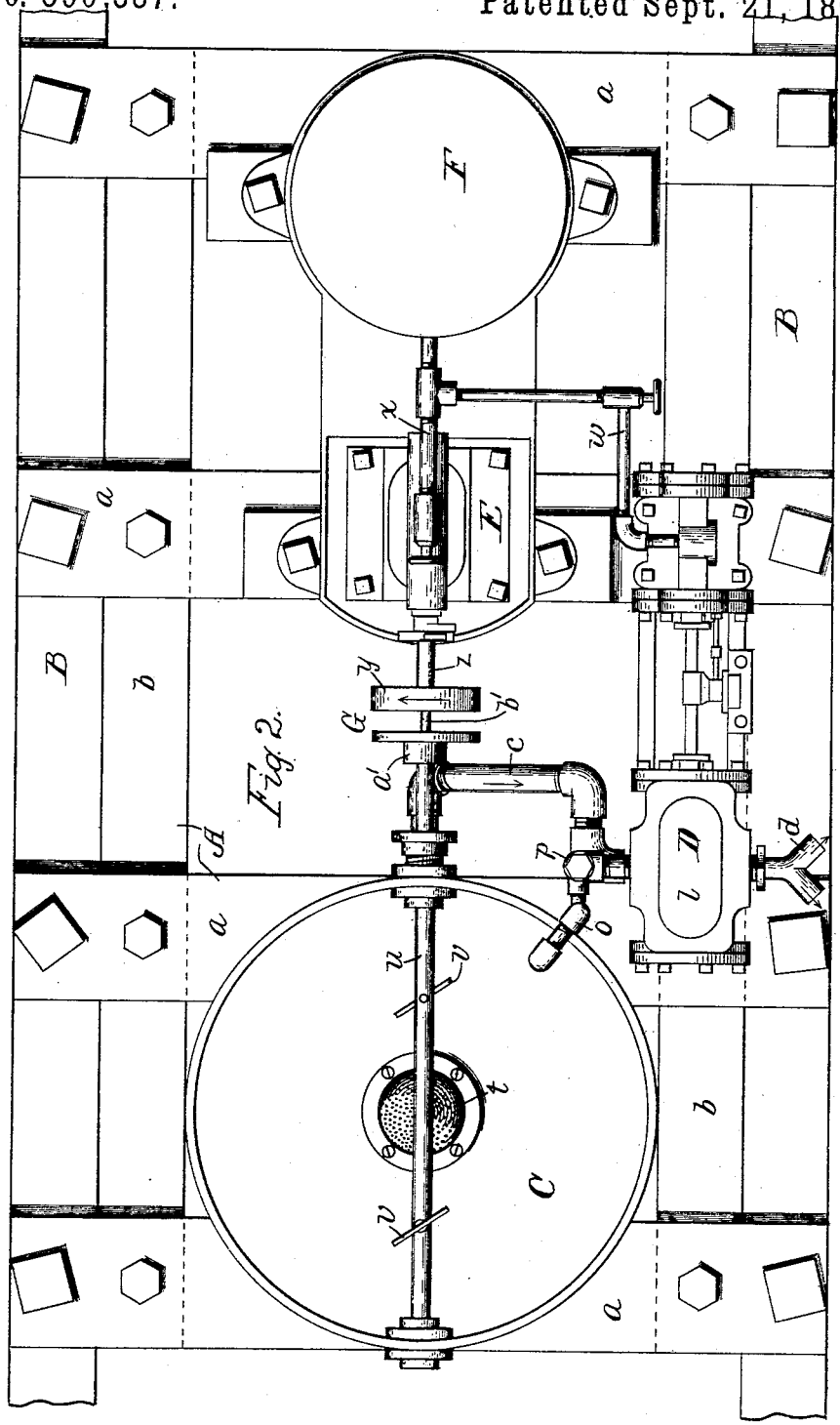
Figure 3:
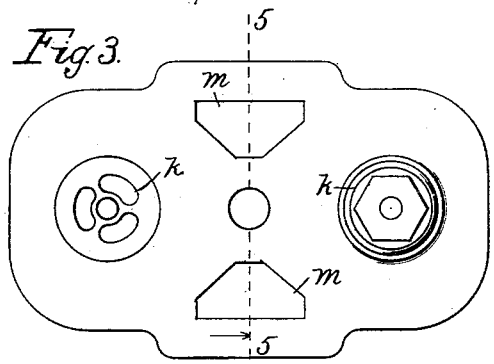
Figure 4:
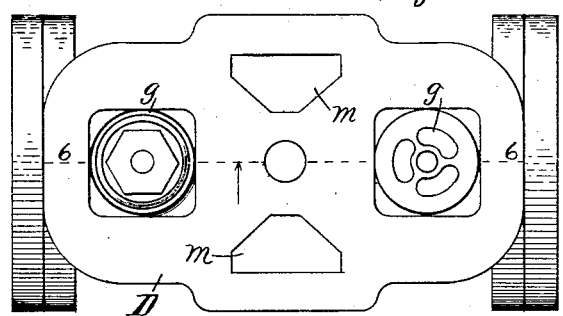
Figure 5:
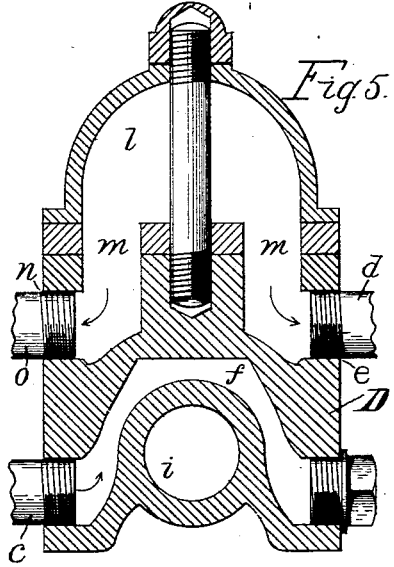
Figure 6:
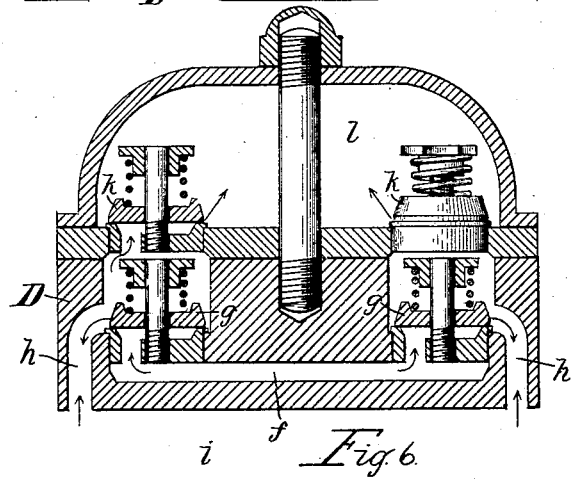
Figure 7:
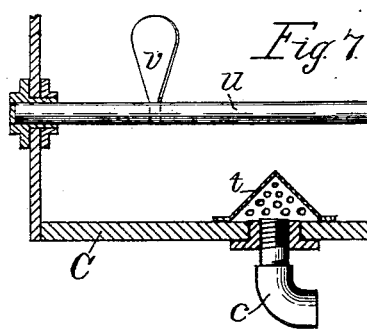
Figure 8:
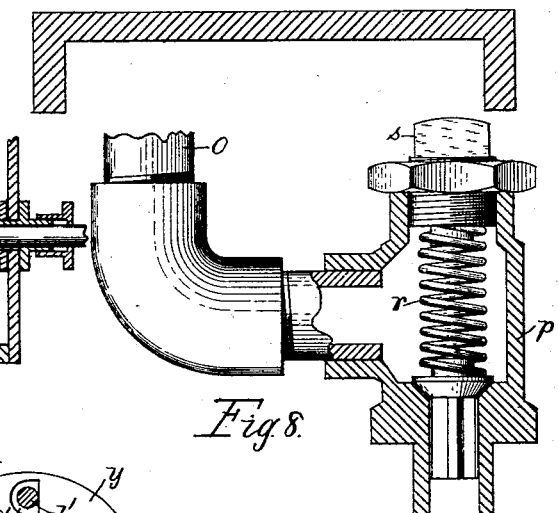
Figure 9:
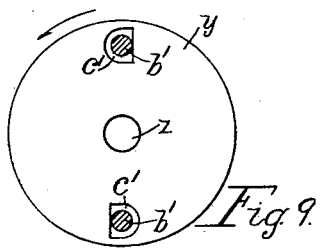

Referring to the drawings, Figure 1 is a side elevation of the machine with minor parts broken away and omitted. Fig. 2 is a plan of the machine with minor parts broken away and omitted. Fig. 3 is a plan of the valve-plate of the power-pump with a part omitted. Fig. 4 is a view of the upper face of the pump with a part omitted. Fig. 5 is a transverse section as on the dotted line 5 5 in Fig. 3. Fig. 6 is a longitudinal section as on the dotted line 6 6 in Fig. 4 and viewed as indicated by the arrow. Fig. 7 is a vertical diametrical section of the lower parts of the tank upon a plane coincident with the axis of the agitator. Fig. 8 shows the relief-valve in axial section with associated parts. Fig. 9 shows the form of the driving-clutch. Figs. 1, 2, and 7 are drawn to a scale smaller and Fig. 8 to a scale larger than that of the other figures.

Referring to the drawings, A, Fig. 1, is a base-frame for supporting the superstructure. This frame is commonly constructed of timbers with sills $b$ and cross-trees $a$, having overhanging ends to rest upon longitudinal skids or timbers B, placed upon the bolsters of the wagon next to the stakes, the width of the frame being adapted to rest within the stakes of the wagon. Upon this base-frame or foundation is mounted a tank C for holding the spraying liquid, a power force-pump D for forcing the liquid out through the spraying-nozzles, a low-power engine E for mixing or agitating the spraying liquid and pumping feed-water, and a steam-generator F to supply steam for driving the power-pump and the engine. Steam is conducted to the engine from the generator through a pipe $x$, Figs. 1 and 2, and to the power-pump through a pipe $w$, each pipe being provided with a throttle-valve of common kind to control the flow of steam from the generator.

A pipe $c$, Figs. 2, 5, and 7, leads from the center of the bottom of the tank to the power-pump, through which the spraying liquid is drawn by the pump, the liquid being forced out of branch pipes $d$ through a delivery-opening $e$. (See Fig. 1.) The action of the piston of the pump draws the liquid into the chamber $f$, Figs. 5 and 6, alternately up through the valves $g\ g$, Fig. 4, and down through the side pipes $h\ h$, Fig. 6, into the space $i$. From this space it is forced alternately back through the side pipes $h\ h$ and up through the upper valves $k\ k$, Figs. 3, 5, and 6, into the chamber $l$. This chamber communicates with the delivery-opening $e$ and a corresponding delivery-opening $n$ at the opposite side of the pump through passages $m\ m$. A return-pipe $o$, Figs. 1, 2, 5, and 8, connected with the pump at the opening $n$, leads back into the tank, as shown, forming a communication between the interior of the chamber $l$ and the tank. In the course of this pipe there is interposed a valve $p$, Figs. 2 and 8, provided with a spring $r$ for controlling the passage through the pipe.

Rubber hose are connected with the branches of the pipe $d$, which hose terminate in nozzles, by means of which two streams of the liquid are thrown out simultaneously. The nozzles are managed by attendants riding upon the wagon, who turn the streams in opposite directions upon trees passed on either side of the wagon as the latter moves along. Thus the near side of the trees of two rows may be sprayed simultaneously as the sprayer is drawn by the horses between the rows. The nozzles are provided at their discharge-orifices with some suitable devices of well-known construction for converting the liquid into spray as it is forced out of the nozzles.

The speed of the power-pump is regulated, in general, with reference to the height or distance to which the spraying liquid needs to be thrown in any given case; but as there is danger when the pressure is too great of bursting the hose the valve $p$ is employed, which is set to open at a prearranged pressure. The tension of the spring $r$, which controls the valve, is regulated by means of a screw-plug $s$, holding the upper end of the spring. If it is wished to subject the hose to a pressure no greater than, say, seventy pounds to the square inch, the spring is set to yield at that pressure and allow the valve to rise and let the surplus liquid drawn from the tank escape back into the tank through the pipe $o$. Thus if the pump at any time draws more liquid from the tank than can be forced out at the nozzles under a pressure of seventy pounds the surplus will flow back in a steady stream into the tank while the spraying of the trees is progressing. The discharge-pipes $o$ and $d$ both leading from the chamber $l$ of the pump, the liquid in both pipes is subjected to the same pressure resulting from the action of the pump.

The opening in the bottom of the tank out through which the liquid is drawn is covered by a conical perforated cap $t$, Figs. 2 and 7.

The spraying liquid is usually water containing an insecticide—as, for example, a mixture of paris-green, lime, and royal blue—which needs to be thoroughly mixed with the water and agitated before being drawn from the tank by the pump. To keep the liquid well mixed and constantly agitated in the vicinity of the perforated cap $t$, there is employed a mixer or agitator having a horizontal shaft $u$, Figs. 2 and 7, crossing the interior of the tank near the bottom. This shaft is provided with agitators or blades $v$ of such form and number best calculated to keep the liquid constantly agitated and mixed while the trees are being sprayed. These blades are preferably fan-shaped, as shown, and set so that their planes will be inclined to the axis of the shaft and on opposite sides thereof. The shaft is rotated rapidly by means of the engine E, the connection between the engine and the agitator being effected by a coupling device G. A rapid revolution of the agitator causes violent currents of water to move in various directions, including vertical directions, which prevent the heavier or solid substances of the spraying liquid from settling to the bottom of the tank, but cause them to be evenly distributed throughout the body of water in the tank.

The clutch G consists of a driving-section $y$, Figs. 1, 2, and 9, rigid with the engine-shaft $z$, and a driven section $a'$, rigid with the agitator-shaft $u$. Studs $b' b'$, rigid in the part $a'$, reach across into openings $c' c'$ in the part $y$, by means of which motion is communicated from the part $y$ to the part $a'$. The holes $c' c'$ are made larger than the adjacent parts of the driving-studs $b' b'$, so the latter will not cramp in the part $y$ on account of slight relative motions of the engine and the tank caused by the jolting of the wagon. Also in mounting the engine and the tank upon the base-frame A there is not need for so much pains to be taken to bring the axes of the shafts $z$ and $u$ into exact line, as would be the case were the fit close between the studs and the section $y$, the size of the holes $c'$ serving to compensate for all such small irregularities.

What I claim as my invention is—

1. In a spraying device, the combination, with a support, of a steam-generator and a tank thereon, an engine between the generator and the tank, an agitator in the tank, the shaft of which is in a line with the shaft of the engine, a clutch for connecting said shafts, and a steam-pump connected with the generator and with the tank, substantially as set forth.

2. In a spraying device, the combination, with a support, of a steam-generator, a tank, an agitator therein, an engine connected therewith, a pump, a branch pipe connecting the engine and the pump with the generator, two pipes leading from the pump to the tank, and a discharge-pipe leading from the pump, substantially as set forth.

3. In a spraying device, the combination with a tank for holding the spraying liquid, the opposite sides thereof being provided with bearings, of a shaft in said bearings, said shaft being provided with blades upon the opposite sides thereof, said blades being inclined to the axis of the shaft, a motor for said shaft, a pump, and a conduit leading from the tank intermediate the position of said blades upon the shaft, and connecting with the pump, substantially as set forth.

In witness whereof I have hereunto set my hand, this 8th day of September, 1896, in the presence of two subscribing witnesses.

JOHN BUCKLEY.

Witnesses:
ENOS B. WHITMORE,
M. L. WINSTON.